March 31, 1942.  A. MERCIER  2,277,855
CATERPILLAR TRACTOR
Filed Feb. 17, 1939  3 Sheets-Sheet 1

Inventor:
Adrien Mercier
per Fred F. Barlow
Attorney

March 31, 1942.  A. MERCIER  2,277,855
CATERPILLAR TRACTOR
Filed Feb. 17, 1939  3 Sheets-Sheet 2
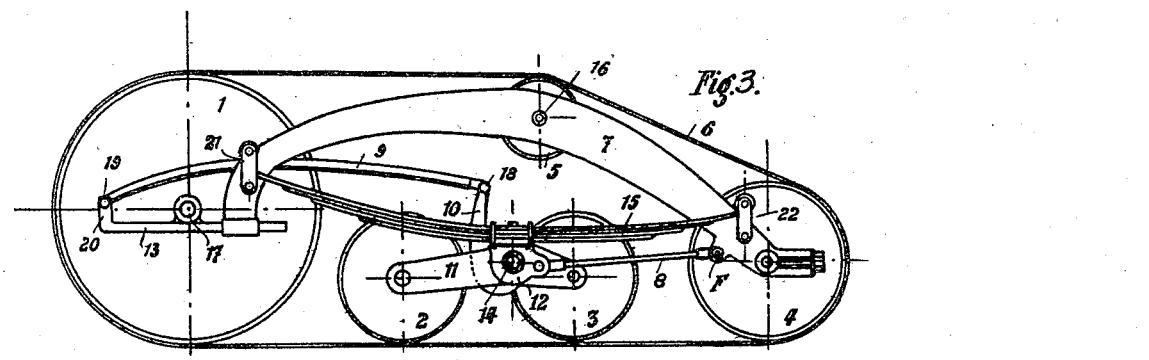
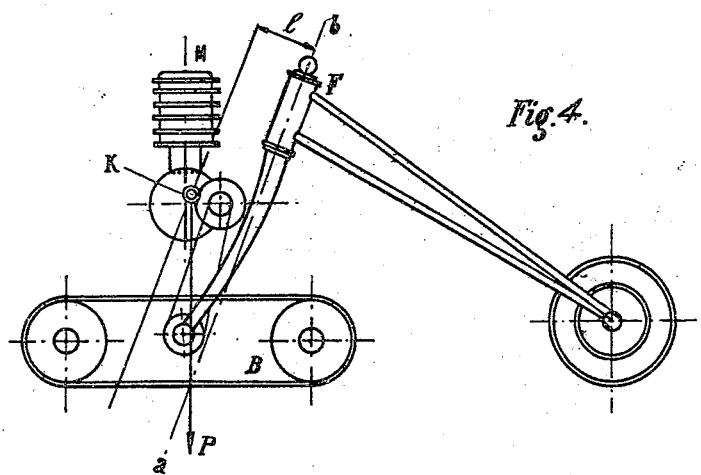
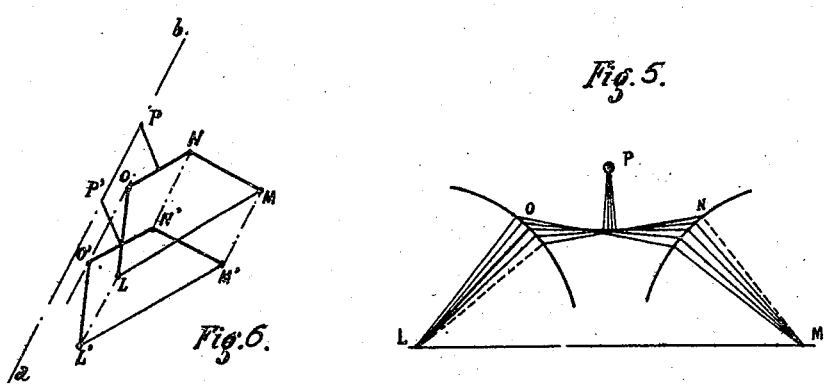
Inventor:
Adrien Mercier
per Fred F. Barlow
Attorney March 31, 1942. A. MERCIER 2,277,855
CATERPILLAR TRACTOR
Filed Feb. 17, 1939 3 Sheets-Sheet 3

Inventor:
Adrien Mercier
Fred F. Barlow
Attorney

Patented Mar. 31, 1942

2,277,855

UNITED STATES PATENT OFFICE 2,277,855

CATERPILLAR TRACTOR

Adrien Mercier, Bois Colombes, France

Application February 17, 1939, Serial No. 256,870
In France April 5, 1938

9 Claims. (Cl. 180—9.1)

This invention relates to endless track mechanism and is particularly concerned with such mechanisms suitable for constituting steering units of endless track vehicles or tractors, for example motor-cycles, suitable for mechanized forces of modern armies or power-driven cultivators.

According to the invention an endless track mechanism constituting a steerable unit of an endless track vehicle or tractor, comprises a front roller and a rear roller for the endless track, a pair of rollers intermediate said front and rear rollers and adapted to bear on the said track and means for unequally distributing the load upon said pair of intermediate rollers in such a manner that, when the unit is under traction, a maximum pressure is exerted on the ground at a single definite position so that, by making this position coincide with the steering axis of the unit, a minimum effort is required for effecting the steering thereof.

In accordance with a subsidiary feature of the invention the mechanism includes means which connects the pair of intermediate rollers with the front and rear rollers and is such as to maintain a substantially constant tension of the ground-engaging portion of the endless track, irrespective of undulations in the surface being traversed.

One preferred embodiment of the invention provides a driving means, such as a motor unit, in association with the steering means, and the arrangement is such that the pivotal steering axis which passes through the ground in the position where the maximum pressure is exerted by the tractive belt, also passes through the centre of gravity of the said driving means.

In order that the invention can be fully appreciated, it will now be more particularly described with reference to the accompanying drawings, which are given merely by way of example and wherein:

Fig. 3 shows diagrammatically a side elevation of a preferred constructional embodiment of the invention.

Fig. 4 shows diagrammatically the arrangement of a motor-cycle of conventional structure and possessing a normal steering mechanism.

Figs. 5 and 6 show diagrammatically the arrangement of a preferred mechanical arrangement for connecting the endless track unit and a motor unit assembly to the framework of a motor-cycle.

Figure 1:
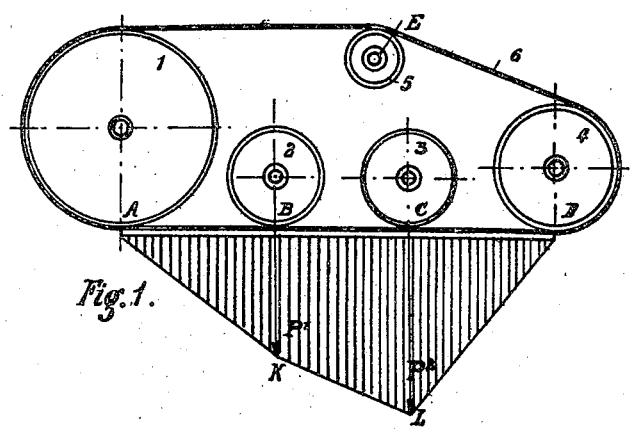
Fig. 1 shows diagrammatically an endless track according to the invention and indicates the distribution of the load thereon when the track is at rest.
Figure 2:
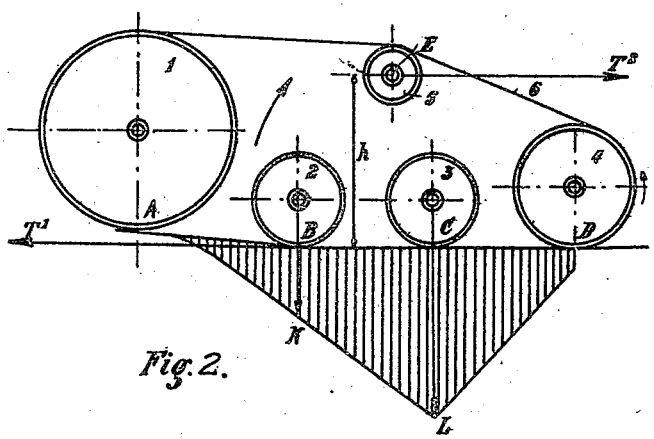
Fig. 2 shows diagrammatically the arrangement of Fig. 1 and the distribution of the load when the track is in motion.

If, as represented by Fig. 1, there are designated by 1, 2, 3, 4 and 5 the rollers supporting a continuous rolling band 6 and the load is judiciously distributed, that is to say nil at the points A and D, and at B a load $P^1$ as well as at C a load $P^2$, the diagram ADLK represents the pressure on the ground for the "caterpillar" when at rest. If now the tractive force $T^1$ (Fig. 2) is exerted, considering that the point E represents the spindle connecting the "caterpillar" to the vehicle and through which the reaction force $T^2$ passes, these two forces give a moment $$M = T^1 \times h$$

this moment tending to raise the front extremity of the "caterpillar," that is to say to raise the attacking roller 1. The former diagram ADLK represented in Fig. 1 is therefore transformed into a new diagram represented in Fig. 2.

The distribution of the loads on the carrying part of the rolling band when the "caterpillar" is tractive and by causing the moment $M = T^1 \times h$ to intervene, corresponds to the diagram ADL in which the maximum of pressure on the ground is on the element C. It is through the axis of this element that the pivoting axis of the "caterpillar" will have to pass.

According to Fig. 3 representing a steerable "caterpillar" constructed according to the principles enumerated above, the attacking roller 1 is connected to the side bars 7 of the equalizing means through the intermediary of two slides 13 disposed on each side and mounted on the spindle 17. The variable position of this roller is controlled by a system of two links 9 pivoted on one end at 19 on the bracket 20 of the slides 13 and on the other at 18 on the cam 10 intended automatically to control the tension of the chain or band 6 as will be hereafter described. The attacking roller 1 is therefore connected to the link system forming the movable carriage of the "caterpillar" through the intermediary of these two links 9; this system comprising the front supporting roller 2, the rear supporting roller 3, the links 8, the controlling cam 10, the levers or arms 11 supporting the rollers and the bearing supports 12 mounted on the pivots 14. This system is carried by the suspension springs 15 connected to the brackets 21 and 22 therefor, fixed on the "caterpillar" bars 7. On the other hand, this system is connected by the links 8 to the fixed points F of the said bars 7.

It is easy to understand that when the "caterpillar" is subjected to jolts, in taking up the unevennesses of the ground, the movable carriage described rises and falls by compressing the suspension springs 15. The links 8 and 9 then automatically control the position of the attacking roller 1, thus assuring the regular tension of the rolling band 6, in spite of the pivoting of the rollers 2 and 3, around the spindle 14, the movable spindle 17 thus moving towards the front or the rear according to requirements.

The cam 10 inserted between arms of the movable system described and the controlling links 8 and 9 of the attacking roller is guided in an appropriate manner. It is pivoted at 18 on the extremities of the links 9 and is maintained by the supports 12 and the arms 11. Its position therefore varies according to the oscillations of the carrying rollers 2 and 3 with which it is integral and by acting directly on the links 8, the position of the attacking roller 1 is modified independently of the position of the carriage.

In order to distribute according to the determined diagram the efforts sustained respectively by the rollers 2 and 3, these latter as has been seen are connected the one to the other by means of two oscillating arms 11 pivoting around the supporting spindle 14, mounted on the suspension springs 15, the respective position of these two rollers and of the spindle thus being accurately fixed. In other words the weight of the machine is supported by the "caterpillar" bars 7 through the intermediary of the spindle 16, these arms supporting the extremities of the suspension springs 15 which in their turn rest on the bearing supports 12 carrying the pivoting spindle 14 of the carriage. This pivoting spindle being supported by the two oscillatory arms 11, it is comprehensible that the load is unequally distributed on the two carrying rollers 2 and 3.

The movements of the movable carriage can be analysed according to the following two phases:

1. The carriage rises and falls under the effect of jolts and of the suspension springs, the links 8 and 9 maintaining the tension of the endless band by modifying the position of the attacking roller 1.

2. The carriage oscillates, that is to say the levers or arms 11 and consequently the rollers 2 and 3 pivot around the spindle 14 without compressing the springs 15, the cam 10 then coming into action to actuate the controlling links 9 also modifying the position of the attacking roller.

These two phases are perfectly distinct the one from the other, they can be successive or simultaneous, the automaticity of the constant tension being constantly safeguarded.

It should be noted that this novel conception assuring the constant tension of the rolling band whatever may be the deformation imparted to it by the unevennesses of the ground presents undoubted advantages over all "caterpillars" at present in use.

By way of non-limitative example, the descriptions which follow describe the application of such a steerable "caterpillar" to the case of a motor-cycle.

In order to obtain the maximum effort of its tractive force, this "caterpillar" must be heavily loaded and the weighty members of the motor-cycle are disposed above it. These members are the engine, the clutch and the gear box which will be designated hereafter by "motor-unit."

As already stated, the position of the pivoting axis of the "caterpillar" is determined by the pressure curve of this latter on the ground.

Fig. 4 shows diagrammatically the arrangement of a motor-cycle of conventional structure and possessing a normal steering post. If there is designated by B' the steerable "caterpillar", by $a$—$b$ the pivoting axis, S the steering post, K' the centre of gravity of the motor-unit, H the distance from this centre to the axis $a$—$b$, such a construction would present the following disadvantage.

The centre of gravity of the motor-unit not being situated on the pivoting axis $a$—$b$ but at a distance H from this latter, the change of direction of the "caterpillar" would cause the centre of gravity to describe an arc of a circle of radius H. The steering effort would from this fact be augmented by the value P.H. There would be lack of balance. Moreover, if the vehicle were inclined, for example, at the time of a sharp turn, this moment P×H corresponding to the lack of balance would affect the steering, causing the assembly to pivot around the axis $a$—$b$. The motor-cycle would be unstable and great difficulty would be experienced in controlling the direction.

The problem therefore consists in finding a mechanical solution for connecting the pivoting "caterpillar" motor-unit assembly to the framework of the motor-cycle so that the pivoting axis of the assembly passes through the centre of gravity of the motor-unit.

According to Fig. 5, L'MNO represents an isosceles trapezium, L'M being the large base and L and M two pivoting points. The apices N and O can move respectively over two arcs of a circle of radius L'O and of centres L and M. These movements of the small base NO permit of transforming this isosceles trapezium into a succession of equilateral quadrilaterals, the sides NO of which make variable angles with L'M. If a perpendicular is drawn from the middle of NO, there is found on it a point P which remains equidistant from the two pivots L' and M despite small variations of inclination of NO.

If now two identical isosceles trapeziums L'MNO and L²M'N'O' are superposed according to two parallel planes as represented by Fig. 6, these trapeziums being dimensioned in such a way that the points P³ and P' are located at a determined distance from NO and N'O', there is obtained by joining P³ to P', a geometrical axis the points of which remain fixed for small deformations of the equilateral quadrilateral, the axes L'L²', MM', NN' and OO' being able to be considered as the axes of four actual spindles S'. The distance from the point P³ to NO is such that the axis PP' passes through the centre of gravity of the motor-unit and is one with the pivoting axis $a$—$b$ imposed by the caterpillar.

From the above considerations there is obtained in the following manner a rigid turnable assembly for connecting the driving elements of a caterpillar motor-cycle to the framework of the machine.

Figure 7:
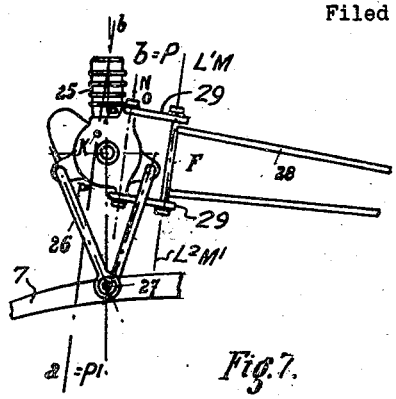
Figs. 7 and 8 show diagrammatically a preferred constructional embodiment of the mechanical system shown in Fig. 6.
Figure 8:
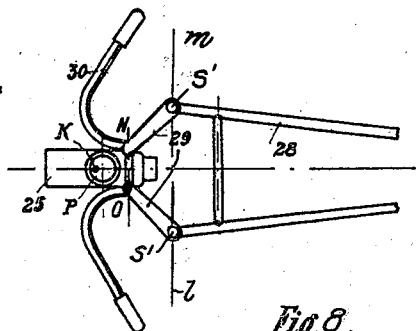

According to Figs. 7 and 8, 25 is the motor-unit carried by the fork 26, and 27 the attaching spindle of the caterpillar to the fork, 28 designating the main frame of the motor-cycle. This latter carries two pivoting spindles S' which are parallel and of judiciously chosen inclination. The extremities of these spindles give the pivoting points L, M, L', M'.

The motor-unit 25 also carries two parallel and similarly inclined spindles which correspond to the pivoting points O, O', N, N'. By connecting the axes of these spindles by means of four links 29, there is obtained the isosceles trapezium represented in Fig. 5.

By means of a handle-bar 30 united with the motor-unit, the driving assembly can thus be turned at will. Owing to these geometrical properties studied above, the turnable assembly will pivot around the geometrical axis P, P³ which passes through the centre of gravity K' of the motor-unit and coincides with the pivoting axis $a$—$b$, chosen for the orientation of the "caterpillar."

Figure 9:
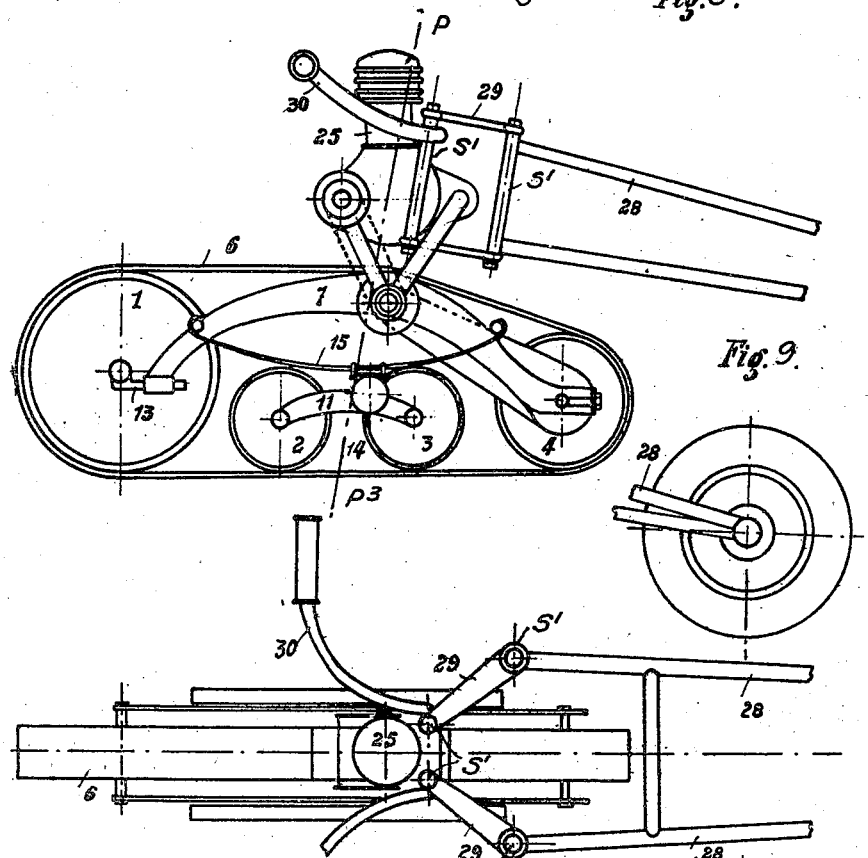
Fig. 9 represents an elevational view of an endless track steering unit and motor unit assembly constructed and arranged in accordance with the invention.
Figure 10:
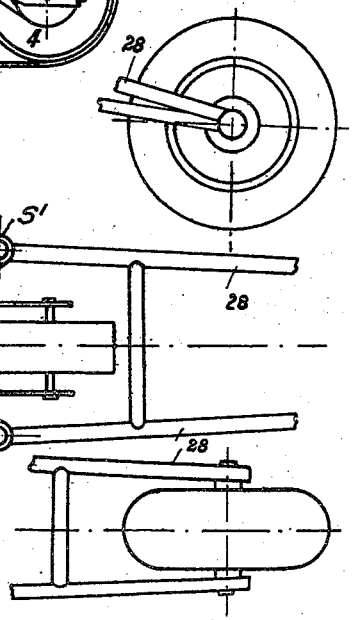
Fig. 10 represents a plan view of Fig. 8.

Figs. 9 and 10 represent a view in elevation and a view in plan of a "caterpillar" motor-cycle constructed according to the characteristics of the present invention and the solution of the problems specially studied in this description to give a rigid and turnable mechanical assembly in which the motor-unit pivots around a geometrical axis passing through its centre of gravity, this axis being one with the chosen pivoting axis for the "caterpillar."

The stability of a "caterpillar" motor-cycle thus constructed is obtained during running with small variations of direction of the steering members, the solution mentioned above giving entire satisfaction while eliminating any lack of balance. Moreover, it presents the great advantage of allowing the motor-cycle to be inclined without the turnable assembly being operated by its weight, which would change its direction.

The invention is not limited to the precise forms or details of construction described, as these may be varied to suit particular cases.

What I claim and desire to secure by Letters Patent of the United States of America is:

1. In a motor vehicle, a main frame, an endless track mechanism for driving the vehicle, said mechanism including equalizing means, front and rear rollers and an intermediate pair of rollers spaced lengthwise of the vehicle within said endless track, a carriage for said intermediate rollers arranged to distribute the load unequally between said intermediate rollers, and steering means pivoted on said frame and connected to said endless track mechanism, the axis of said steering mechanism passing approximately through the point of maximum pressure of said endless track mechanism upon its supporting surface, spring means anchored to the endless track frame, a bearing member carried by said spring means and to which the rockable carriage is pivoted, link means connecting said bearing member with that arm of the main frame upon which the rear roller is mounted, a lever arm movable with the rockable carriage, a slide carried by the front arm of the main frame, bearings on said slide for the front roller and link means connecting the lever arm and the slide for the purpose set forth.

2. In a motor vehicle, a main frame, an endless track mechanism for driving the vehicle, said mechanism including equalizing means, front and rear rollers and an intermediate pair of rollers spaced lengthwise of the vehicle within said endless track, a carriage for said intermediate rollers arranged to distribute the load unequally between said intermediate rollers, and steering means pivoted on said frame and connected to said endless tranck mechanism, the axis of said steering mechanism passing approximately through the point of maximum pressure of said endless track mechanism upon its supporting surface, means whereby the steering unit is mounted to turn about a steering axis which passes through the ground in the position substantially where the maximum pressure is exerted by the endless track, a driving motor and means supporting said motor in association with said steering means so that the centre of gravity of the motor coincides approximately with the said steering axis.

3. In a motorcycle having a front traction device, a front traction element, a main frame, means for pivotally connecting the frame to said traction element for steering the motorcycle, and a power plant for driving said front traction element, the center of gravity of the power plant being substantially in line with the pivotal connection between the frame and the traction element.

4. A device as in claim 3, said front traction element comprising an endless track mechanism including an endless track, front and rear rollers and a pair of intermediate rollers spaced lengthwise of the motorcycle within said endless track, and mounting means for said intermediate rollers arranged to distribute the load unequally upon them during operation, the arrangement of said intermediate rollers being such as to cause the maximum load to fall at a point approximately in line with the pivotal connection between said frame and said endless track element.

5. In a motor vehicle, a main frame, an endless track mechanism for driving the vehicle, said mechanism including front and rear rollers and an intermediate pair of rollers spaced lengthwise of the vehicle within said endless track, a carriage for said intermediate rollers arranged to distribute the load unequally between them and steering means pivoted on said main frame and connected to said endless track mechanism, the axis of said steering mechanism passing approximately through the point of maximum pressure of said endless track mechanism upon its supporting surface.

6. In a motorcycle, a main frame, a front traction device, a power plant at the front of the frame connected to drive said traction device, pivotal connections between said power plant and said frame, the axis of said connections passing approximately through the point of greatest pressure of said traction device upon its supporting surface and through the center of gravity of said power plant, a pair of spaced parallel spindles at the front of the frame spaced laterally with respect to the vehicle, a pair of spaced parallel spindles on said power plant spaced laterally with respect to the vehicle, links connecting respectively the upper and lower ends of the spindles at one side of the vehicle, links connecting the respective upper and lower ends of the other pair of spindles, and steering means connected to said power plant.

7. A device as in claim 6, the spindles on the power plant being parallel to those respectively opposite them on said frame and being similarly inclined but spaced less far apart, the links being all equal in length and lying in parallel planes; the respective sets of connected spindles and links at each side of the vehicle forming similar parallel trapeziums whose non-parallel sides diverge rearwardly from the power plant.

8. A front drive vehicle having a main frame, an endless track mechanism including an endless track, front and rear rollers therein, a pair of intermediate wheels spaced lengthwise of the vehicle between said front and rear rollers, a carriage supporting said intermediate wheels, spring connections between carriage and said main frame, means for supporting the front roller for movement endwise of the vehicle, and means for forcing said front roller bodily forward upon compression of said spring connections between said carriage and the main frame.

9. In a motorcycle, a main frame, a front traction device, a power plant at the front end of the vehicle for driving said traction device, pivotal connections between said frame and said power plant, the axis of said connections passing approximately through the center of gravity of said power plant, laterally spaced spindles on said power plant, laterally spaced spindles on said frame lying in a plane inclined rearwardly from a plane passing through said first named spindles, links connecting said spindles and arranged to form therewith upper and lower trapeziums connecting said frame and power plant, and steering means secured to said power plant.

ADRIEN MERCIER.